…

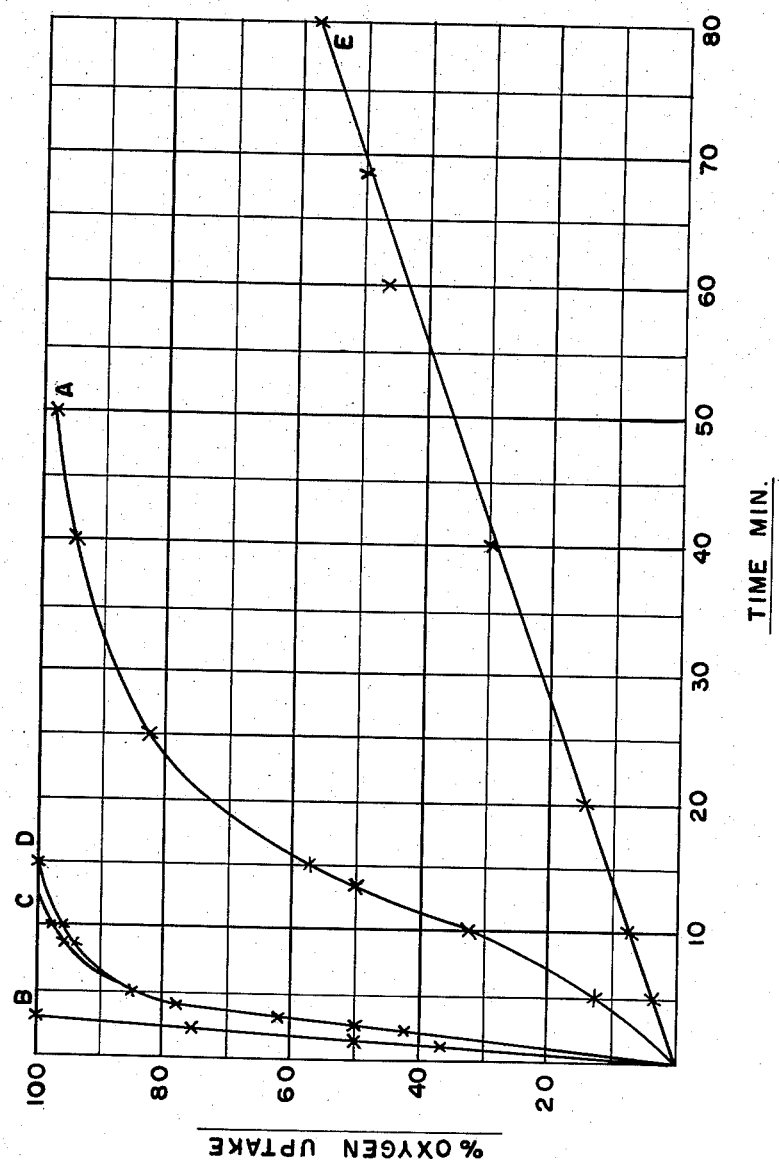
Inventors
Arthur F. McKay
Edward J. Tarlton
Stevens, Davis, Miller + Mosher
Attorneys

United States Patent Office 3,101,373
Patented Aug. 20, 1963

3,101,373
AMINOACID AMIDES
Arthur F. McKay, Beaconsfield, Quebec, and Ctirad Podesva and Edward James Tarlton, Montreal, Quebec, Canada, assignors to Monsanto Canada Limited, LaSalle, Quebec, Canada
Filed Dec. 15, 1961, Ser. No. 159,585
12 Claims. (Cl. 260—567)

This invention relates to the reaction of urea or thiourea with an alicyclic ketone chosen from a select group of ketones in the presence of an inert solvent and to certain new unsaturated $\beta$-aminoacid amides obtained by this reaction.

Compounds of this invention have the formula

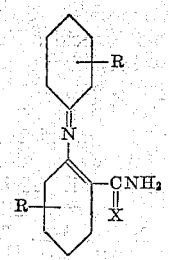

wherein R in both rings is a hydrogen or a lower alkyl group and X is oxygen or sulfur.

In accordance with this invention it has been discovered that when a specific alicyclic ketone is reacted with urea or thiourea in the presence of an inert aromatic hydrocarbon solvent at reflux temperature there are obtained $\beta$-aminoacid amides having the structure disclosed in the above formula.

The specific alicyclic ketones in the reactions of this invention are cyclohexanone and cyclohexanones containing a lower alkyl substituent.

The inert aromatic hydrocarbon solvent in which the reaction takes place is one which enables the removal of water from the reaction by azeotropic distillation. In this process the inert solvent is considered to be a water-carrier. The use of xylene as a water-carrier is found readily suitable in this invention. Toluene and benzene are also applicable when admixed with a second inert solvent. The second inert solvent is one which will dissolve all the reaction components (urea or thiourea, alicyclic ketone and water-carrier) such as, dimethylformamide, dimethylacetamide and the like. It is to be noted that the presence of a second inert solvent is not essential with xylene for high yields of the product of reaction but does improve the efficiency of such a reaction.

In carrying out the reaction at reflux temperatures the hydrocarbon solvent promotes azeotropic removal of the water formed. The reflux temperature varies from about 100° C. to about 160° C. Higher yields and shorter reaction periods result from the use of high reflux temperatures. The time required to complete the elimination of one mole of water per mole of ketone is as little as ten minutes dependent on the temperature and other variable conditions outlined in this application.

The reaction described herein is believed to proceed by the decomposition of urea or thiourea into ammonia and isocyanic acid or isothiocyanic acid and the subsequent reaction of these reagents with the cyclohexanone. To obtain high yields excess urea is used to offset any loss of ammonia during the reaction. A molar ratio of urea to the cyclohexanone present of two to one is found convenient.

The following examples serve to illustrate the present invention. Percent means percent by weight. All melting points were taken in evacuated capillary tubes.

The first eight examples relate to the production of cyclohexylidene 2-carbamylcyclohex-1-enylamine and disclose varying conditions in the reaction within the concept of this invention.

EXAMPLE I

A reaction of cyclohexanone (19.6 g.) and urea (24.0 g.) in the presence of o-xylene (20 ml.) was carried out at reflux temperature (147° C.). Water distilled azeotropically and was collected in a Barrat trap. After forty minutes the elimination of water was complete. The reaction was cooled, diluted with water (50 ml.) and benzene (25 ml.) and the precipitate collected by filtration. Yield 19.9 g. (90.4%), M.P. 197–205° C. Recrystallization from 46% aqueous ethanol (175 ml.) gave purified material 13.8 g. (62.7%), M.P. 224–225° C.

Analysis.—Percent calculated for $C_{13}H_{20}N_2O$: C, 70.95; H, 9.16; N, 12.73. Found: C, 70.85; H, 9.11; N, 12.98.

EXAMPLE II

A reaction of cyclohexanone (19.6 g.) and urea (12.6 g.) in the presence of o-xylene (20 ml.) was carried out at reflux temperature (147° C.). Water distilled azeotropically and was collected in a Barrat trap. After one hour the elimination of water was complete. The reaction was cooled, diluted with water and benzene and the precipitate collected by filtration. Yield: 18.7 g., (85.0%), M.P. 177–190° C. Recrystallization from ethanol-water gave purified material 10.3 g. (46.8%), M.P. 222–225° C.

EXAMPLE III

A reaction of cyclohexanone (19.6 g.) and urea (24.0 g.) in the presence of o-xylene (20 ml.) and dimethylformamide (75 ml.) was carried out at reflux temperature (142–149° C.). Water distilled azeotropically and was collected in a Barrat trap. After one and one-third hours the elimination of water was complete. The solvents were removed in vacuo on a water-bath and the product recrystallized from 43% aqueous methanol (175 ml.) to yield 16.2 g. (73.6%), M.P. 224–225° C.

EXAMPLE IV

Reactants in the same proportions as in Example III, were refluxed (142–149° C.) for two and two-thirds hours, concentrated to one-half volume in vacuo and diluted with water (150 ml.) to yield 18.50 g. (84.1%) of the product, M.P. 215° C. Recrystallization from 45% aqueous ethanol (270 ml.) gave 15.2 g. (69.1%), M.P. 225–226° C.

EXAMPLE V

A reaction of cyclohexanone (19.6 g.) and urea (12.0 g.) in the presence of o-xylene (20 ml.) and dimethylformamide (35 ml.) was carried out at reflux temperature (142–149° C.). Water distilled azeotropically and was collected in a Barrat trap. After two and two-third hours the elimination of water was complete. The reaction mixture was cooled in ice-water, and the precipitate collected by filtration and washed with benzene (50 ml.) to give 18.2 g. (82.7%) of crude product, M.P. 207–215° C. Recrystallization from 45% aqueous ethanol (180 ml.) gave 14.3 g., M.P. 224–225° C.

EXAMPLE VI

A reaction of cyclohexanone (19.6 g.) and urea (24.g.) in the presence of toluene (20 ml.) and dimethylformamide (75 ml.) was carried out at reflux temperature (125–127° C.). Water distilled azeotropically and was collected in a Barrat trap. After three hours elimination of water was complete and the solution reduced to half volume in vacuo. After dilution with water (100 ml.), the product which separated was collected and dried to yield 17.2 g. (78.6%), M.P. 220–224° C. Recrystallization from aqueous methane gave 13.8 g. (62.7%), M.P. 223–225° C.

EXAMPLE VII

A reaction of cyclohexanone (19.6 g.) and urea (12.0 g.) in the presence of toluene (20 ml.) and dimethylformamide (75 ml.) was carried out at reflux temperature (125–127° C.). Water distilled azeotropically and was collected in a Barrat trap. After three and one-third hours elimination of water was complete. The mixture was cooled in an ice-water bath and the crude product was collected by filtration, washed with benzene (50 ml.) and dried to yield 17.6 g. (80.0%) of product, M.P. 190–195° C.

EXAMPLE VIII

A reaction of cyclohexanone (19.6 g.) and urea (24.0 g.) in the presence of benzene (20 ml.) and dimethylformamide (75 ml.) was carried out at reflux temperature (119–131° C.). Water distilled azeotropically and was collected in a Barrat trap. After three and one-half hours elimination of water was complete. The solution was evaporated to dryness in vacuo and the residue recrystallized from 57% aqueous methanol (210 ml.) to yield 17.6 g. (80.0%), M.P. 201–214° C. Recrystallization from aqueous methanol gave 10.2 g. (46.4%) of purified product, M.P. 222–224° C.

EXAMPLE IX

*Cyclohexylidene 2-Thiocarbamylcyclohex-1-Enylamine*

A reaction of cyclohexanone (19.6 g.) and thiourea (30.5 g.) in the presence of o-xylene (20 ml.) and dimethylformamide (75 ml.) was carried out at reflux temperature (142–149° C.). Water distilled azeotropically and was collected in a Barrat trap. After one and one-half hours elimination of water was complete and the solution reduced to half volume in vacuo. After dilution with water (200 ml.) the solid product was collected by filtration and dried to yield 20.5 g. (86.9%), M.P. 185–202° C. Recrystallization from methanol-water (4:1, 435 ml.) gave 12.2 g., M.P. 215–222° C. Further recrystallization gave an analytical sample, M.P. 218–222° C.

*Analysis.*—Percent calculated for $C_{13}H_{20}N_2S$: H, 8.37; N, 11.54; S, 13.70.

EXAMPLE X

*4-Methylcyclohexylidene 2-Carbamyl-4Methylcyclohex-1-Enylamine*

A reaction of 4-methylcyclohexanone (22.4 g.), and urea (24.0 g.) in the presence of o-xylene (20 ml.) was carried out at reflux temperature (147° C.). Water distilled azeotropically and was collected in a Barrat trap. After forty-five minutes elimination of water was complete. The mixture was cooled and diluted with water (50 ml.). The precipitate was washed with water and benzene and dried to yield 25.4 g. of product, M.P. 166° C. with some decomposition. Recrystallization from 47% aqueous ethanol (150 ml.) gave 17.2 g. (69.3%), M.P. 203–207° C.

*Analysis.*—Percent calculated for $C_{15}H_{24}N_2O$: C, 72.54; H, 9.74; N, 11.28. Found: C, 72.37; H, 9.50; N, 11.29.

EXAMPLE XI

*4-Methylcyclohexylidene 2-Thiocarbamyl-4-Methylcyclohex-1-Enylamine*

A reaction of 4-methylcyclohexanone (78.5 g.) and thiourea (106.4 g.) in the presence of o-xylene (70 ml.) and dimethylformamide (260 ml.) was carried out at reflux temperature (147° C.). Water distilled azeotropically and was collected in a Barrat trap. After three hours elimination of water was complete. The solvent was removed in vacuo and the crystalline residue triturated with boiling 10% aqueous methanol (500 ml.). Yield 37.1 g. (40%), M.P. 250° C. Recrystallization from dimethylformamide raised the melting point to 257–258° C.

*Analysis.*—Percent calculated for $C_{15}H_{24}N_2S$: C, 68.13; H, 9.15; N, 10.59; S, 12.12. Found: C, 68.05; H, 9.42; N, 10.61; S, 12.19.

EXAMPLE XII

*4-t-Butylcyclohexylidene 2-Carbamyl-4-t-Butylcyclohex-1-Enylamine*

A reaction of 4-t-butylcyclohexanone (29.0 g.) and urea (22.5 g.) in the presence of o-xylene (50 ml.) and dimethylformamide (100 ml.) was carried out at reflux temperature (145° C.). Water distilled azeotropically and was collected in a Barrat trap. After three hours the elimination of water was complete. The reaction was cooled and the precipitate collected by Filtration. Yield 14.7 g. (47.1%), M.P. 269° C. Recrystallization from ethanol raised the melting point to a constant value of 273–275° C.

*Analysis.*—Percent calculated for $C_{21}H_{36}N_2O$: C, 75.86; H, 10.91; N, 8.42. Found: C, 76.12; H, 11.08; N, 8.44.

The unsaturated β-aminoacid amides produced in accordance with the novel reaction of this invention have a variety of uses. In particular, due to their great affinity for oxygen they are useful as oxygen scavengers. To illustrate this utility 27.5 g. of cyclohexylidene 2-carbamylcyclohex-1-enylamine were put in 750 ml. of chloroform and the solution was divided into five equal parts. The equal parts were placed in a series of 250 ml. round bottom flasks, A, B, C, D and E. The solution in each flask was then treated as follows:

A—with no additive
B—with 92 mg. of a 6% by weight cobalt naphthenate drier solution, i.e. 0.1% by weight of cobalt
C—with 9.2 mg. of a 6% by weight cobalt naphthenate drier solution, i.e. 0.01% by weight of cobalt
D—with 92 mg. of a 6% by weight lead naphthenate drier solution, i.e. 0.1% by weight of lead
E—with 5.5 mg. of butylated hydroxytoluene, i.e. 0.1% by weight.

The treatment was at 20° C. under atmospheric pressure with rapid magnetic stirring in an oxygen atmosphere.

The rate of oxygen uptake in each of the flasks A, B, C, D and E is shown in the accompanying drawing by curves, A, B, C, D and E respectively. The percentage of absorption is in the fraction of one mole of oxygen per mole of the amide corrected for temperature (theoretical volume is 602 ml.). As will be observed a 50% uptake occurred in flasks A, B, C, D and E in 13.5, 1.5, 2.5, 2.5, and 68.5 minutes respectively.

The graph therefore discloses the scavenger properties of the novel amides of this invention to be very effective when used either alone or with metallic driers. From curve E it is also apparent that the presence of an antioxidant, even in trace amounts, can be easily detected from the rate of oxygen uptake by any of the unsaturated β-aminoacid amides of this invention.

What is claimed is:

1. A compound of the formula

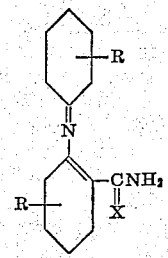

wherein R in each ring is selected from the group consisting of a hydrogen and a lower alkyl group and X is selected from the group consisting of O and S.

2. Cyclohexylidene 2-carbamylcyclohex-1-enylamine.

3. Cyclohexylidene 2 - thiocarbamylcyclohex - 1 - enylamine.

4. 4-methylcyclohexylidene 2-carbamyl-4-methyl-cyclohex-1-enylamine.

5. 4-methylcyclohexylidene 2-thiocarbamyl-4-methyl-cyclohex-1-enylamine.

6. 4 - t - butylcyclohexylidene 2 - carbamyl-4-t-butyl-cyclohex-1-enylamine.

7. The method for the preparation of aminoacid amides of the formula

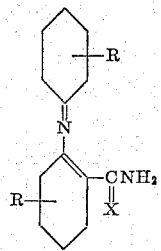

wherein R in each ring is selected from the group consisting of a hydrogen and a lower alkyl group and X is selected from the group consisting of O and S, which comprises the reaction of one of the group consisting of cyclohexanone and a lower alkyl cyclohexanone with one of the group consisting of urea and thiourea in the presence of an inert aromatic hydrocarbon solvent to remove water of the reaction by azeotropic distillation, the reaction being carried out at reflux temperature.

8. The method as described in claim 7 in which the inert solvent is xylene.

9. The method as described in claim 7 in which the inert solvent is a xylene-dimethylformamide mixture.

10. The method as described in claim 7 in which the inert solvent is a toluene-dimethylformamide mixture.

11. The method as described in claim 7 in which the inert solvent is a benzene-dimethylformamide mixture.

12. The method as described in claim 7 in which the reaction temperature is in the range of from about 100° C. to about 160° C.

No references cited.